Dec. 15, 1931. É. LAFFINEUR ET AL 1,836,853

MACHINE FOR FORMING OVALS

Filed Feb. 8, 1930 4 Sheets-Sheet 1

Inventors:-
Emile Laffineur
& Louis Collin
by Langner, Parry, Card & Langner
Attys.

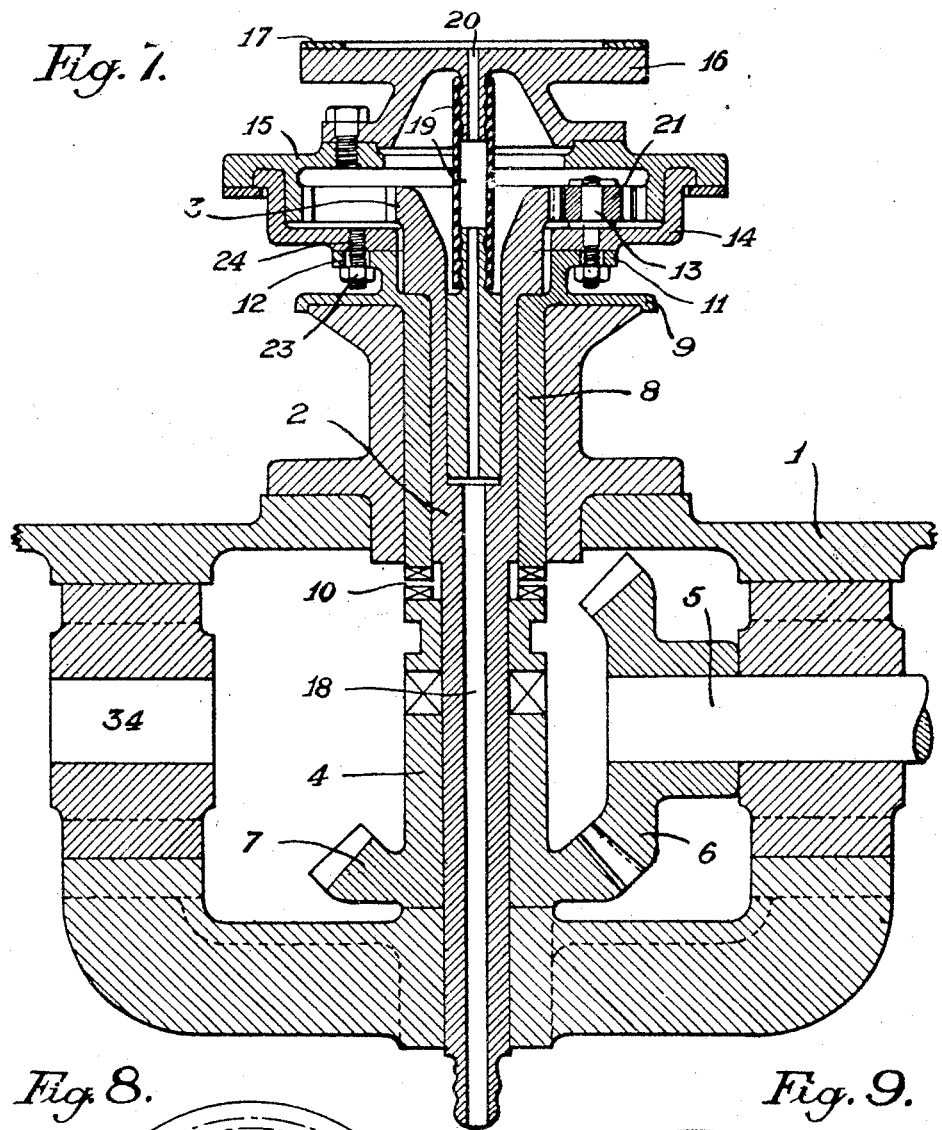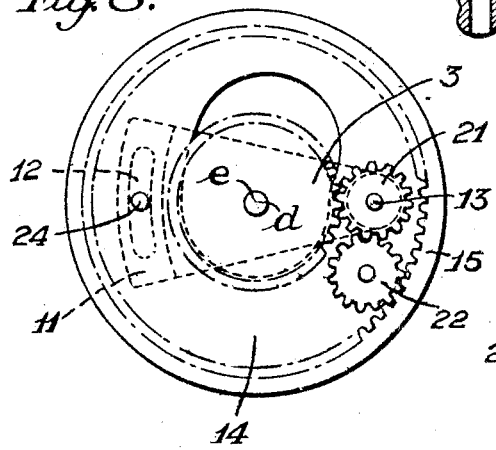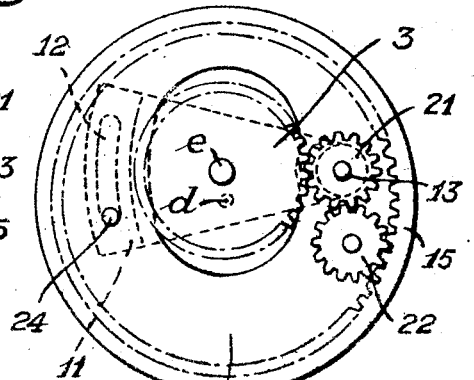

Dec. 15, 1931.    E. LAFFINEUR ET AL    1,836,853
MACHINE FOR FORMING OVALS
Filed Feb. 8, 1930    4 Sheets-Sheet 3

Inventors:-
Emile Laffineur
& Louis Collin
by
Attys.

Dec. 15, 1931. E. LAFFINEUR ET AL 1,836,853
MACHINE FOR FORMING OVALS
Filed Feb. 8, 1930 4 Sheets-Sheet 4

Inventors:
E. Laffineur &
L. Collin

Patented Dec. 15, 1931

1,836,853

UNITED STATES PATENT OFFICE

EMILE LAFFINEUR, OF MARCHIENNE-AU-PONT, AND LOUIS COLLIN, OF MONCEAU-SUR-SAMBRE, BELGIUM

MACHINE FOR FORMING OVALS

Application filed February 8, 1930, Serial No. 426,982, and in Belgium February 16, 1929.

This invention relates to machines for forming ovals, this term being intended to include ellipsographs as well as machines for cutting or plastering oval-shaped frames and machines or apparatus wherein all the points at the periphery of an oval-shaped or elliptic article, which is brought into rotation, are caused to pass successively through a same fixed point, in order to be worked by a tool placed at that fixed point. Hitherto crossed slides were generally utilized, which have the disadvantage of rendering the machines cumbersome when the glass plates, frames or other elliptical articles to be treated are large-sized, and of subjecting the parts of the mechanism through which rotation is transmitted, to excessive stresses, resulting in a rapid wearing of these parts.

The present invention has the object to solve the problem in a far simpler way than by means of slides, and to permit of considerably reducing the necessary dimensions of such machines as well as the wear of their parts. It consists essentially in giving the centre of the elliptical article, i. e. the point of intersection of its long and short axes, a rotation about a fixed point in a given direction, and simultaneously imparting to the article a rotation about said centre, but in the reverse direction and at a speed half as great as that of the first rotation. In other words, during the time the article performs a complete revolution about the fixed point, say from right to left, it is made to accomplish half a revolution from left to right about its own centre.

According to the invention, this double rotation is imparted to the article by means of an epicycloidal gearing comprising a fixed central spur wheel, a planet pinion engaging said spur wheel and moved concentrically thereto by a crank-plate, a reversing pinion carried on said crank-plate and engaging with the planet pinion, and an outer inwardly toothed ring engaging said reversing pinion and adapted to rotate on the crank-plate eccentrically with respect to the fixed central spur-wheel. The various gear ratios are chosen in such a manner that, while the crank-plate performs a revolution in one direction, the outer toothed ring performs half a revolution in the reverse direction relatively to the crank-plate, i. e. the toothed ring accomplishes a full revolution in one direction about the centre of the fixed spur wheel and half a revolution in the reverse direction about its own centre. This outer toothed ring carries the elliptical article to be worked, attached to it by suitable fastening means.

A better understanding of the invention will be had by referring to the accompanying drawings, wherein:

Fig. 7 is a vertical sectional view of a machine for the chamfering of oval-shaped glass plates.

Fig. 8 is a horizontal section of the same machine, substantially through line A—B in Fig. 7.

Fig. 9 is a view similar to Fig. 8, showing the parts in a different position.

Figure 5:
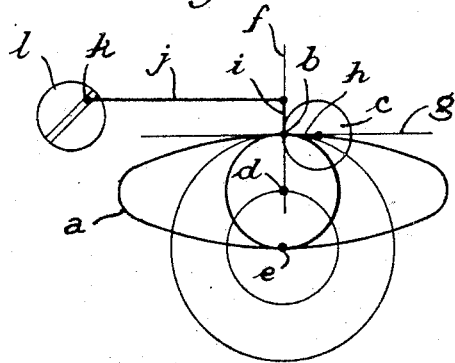
Figs. 5 and 6 are also diagrammatical views showing the invention as applied by way of example to the chamfering of an oval-shaped glass plate.
Figure 6:
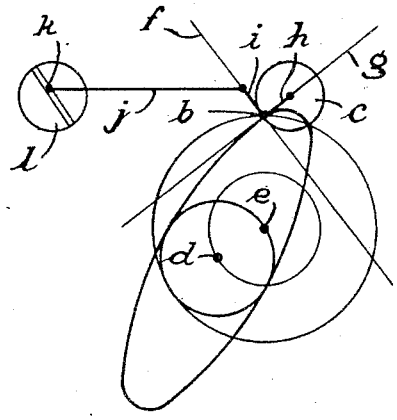

In Figs. 1 to 6, $a$ indicates the elliptical article, an oval-shaped glass plate for example, having all the points of its periphery constrained to pass successively through the fixed point $b$, in order to contact with a tool such as the chamfering wheel shown at $c$ in Figs. 5 and 6. $d$ indicates the centre of the ellipse $a$ and $e$ indicates the fixed point about which the centre $d$ and thus the ellipse $a$ is rotated.

If the ellipse $a$ is merely rotated about point $e$ in the direction of the arrow $x$ (Fig.

Figure 1:
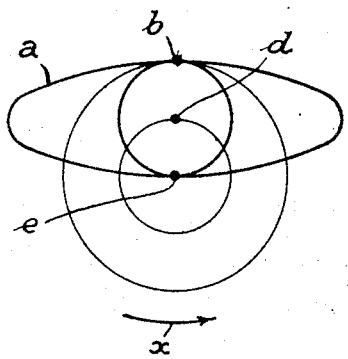
Figs. 1, 2, 3 and 4 are diagrammatical views illustrating the operation of the machine.
Figure 2:
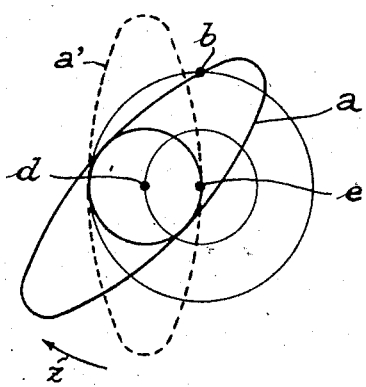
Figure 3:
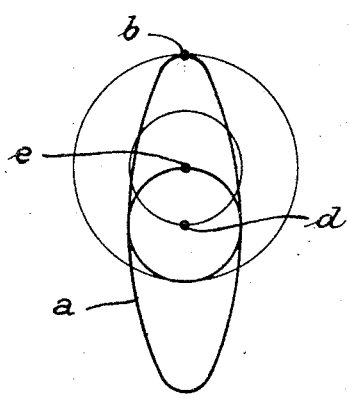
Figure 4:
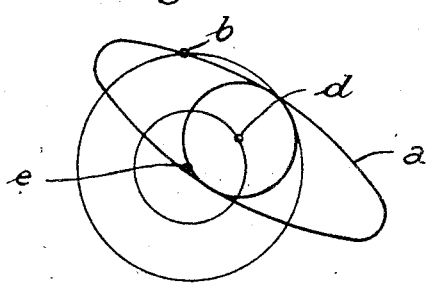

1), no point of its periphery will pass through the fixed point $b$, and after having been rotated through an angle of 90° for example, the ellipse will be in the position $a'$ shown in dotted lines in Fig. 2. If however the ellipse then is rotated through 45° about its centre $d$ in the direction of the arrow $z$ (Fig. 2), i. e. in the reverse direction to the first rotation, it will take up the position in which it is represented in full lines in Fig. 2, where a point of its periphery coincides with the fixed point $b$. Now, if the two motions are combined in such a manner that the ellipse $a$ performs them simultaneously, it will be found that all the points of the arc included between the point of the ellipse's periphery which coincides with the fixed point $b$ in Fig. 1 and the point which coincides with the same point $b$ in Fig. 2, will pass successively through point $b$ as the ellipse is moving. By keeping on rotating the latter about point $e$ in the direction of the arrow $x$, and at half the same speed about its centre $d$ in the direction of the arrow $z$, all other points of its periphery can be brought successively into coincidence with point $b$, the ellipse taking the positions shown in Figs. 3 and 4 and returning to the position shown in Fig. 1.

In order to render the demonstration of the above process fully clear, a very elongated ellipse has been shown in the drawings, but evidently the process applies to all forms of more or less elongated ellipses. It is only required that the distance between the centre $d$ and the fixed point $e$ be adjusted so as to always be equal to one fourth of the difference between the long and short axes of the ellipse.

Figs. 7, 8 and 9 show an apparatus adapted to perform the described process, particularly for chamfering oval-shaped glass plates.

The frame 1 of the machine supports a vertical shaft 2, at the upper end of which is a spur wheel 3. Adapted to rotate about said shaft 2 is a lower sleeve 4 actuated from a driving shaft 5 by means of bevel pinions 6, 7, and an upper sleeve 8 supported on the frame 1 by means of a flange 9 and adapted to be driven by the sleeve 4 by means of a clutch 10. A second flange 11 on sleeve 8, provided with a curved slot 12, concentric to a pin 13 on the other side of the fixed shaft 2, drives by means of said pin 13 a flanged plate 14 on which an inwardly toothed ring 15, carrying an anchoring plate 16 is rotatably mounted. The latter is adapted to carry the glass plate to be chamfered, which rests on a rubber ring 17 and may be fastened to plate 16 either by means of suitable clamps (not shown), or by a vacuum applied underneath the glass plate through a central passage 18 in the fixed shaft 2, a flexible tubing 19 and an orifice 20 in plate 16.

Besides connecting the flanged plate 14 with the flange 11, the pin 13 acts as a spindle for a planet pinion 21 meshing with the fixed central spur wheel 3 and with a reversing pinion 22, which is carried on plate 14 and meshes with the inwardly toothed ring 15. When the sleeves 4 and 8 are coupled together and are actuated by the driving shaft 5, the flange 11 rotates about the fixed shaft 2 and carries with it the flanged plate 14 and the pinions 21 and 22. Pinion 21 meshes with the fixed central spur wheel 3 and rotates about its pivot 13, thereby driving the reversing pinion 22, which in turn drives the toothed ring 15, and thus causes it to rotate on plate 14 in reverse direction to the latter. The gear ratio of the fixed spur wheel 3 and the ring 15 is such that during the time the plate 14 performs a whole revolution forward, the ring 15 performs half-a-revolution backward.

In Fig. 8, the plate 14 and ring 15 are shown concentric to the fixed wheel 3, but owing to the arrangement of the slot 12 in flange 11, the plate and ring can be swung through a certain angle about pivot 13 and thus brought into an eccentric position relatively to spur wheel 3, without the various gears disengaging from each other (Fig. 9). Plate 14 may be fastened to flange 11 in the desired eccentric position by screwing a nut 23 on to a stud 24 passing through slot 12.

When the plate 14, the ring 15 and consequently the carrier plate 16 secured to said ring are thus eccentered with respect to the central spur wheel 3, the conditions set forth in the above description of the process, are fulfilled, i. e. the ring 15 and the oval-shaped glass plate supported on it by means of plate 16, are rotating in one direction about a fixed point $e$, here represented by the centre of the fixed spur wheel 3, and simultaneously in the reverse direction at half-speed, about its own centre $d$ which coincides with the centre of the eccentered plate 14 (Fig. 9).

On the other hand, by varying the eccentricity of said plate 14, the distance between its centre and the centre of wheel 3 may be adjusted so as to correspond to one quarter of the difference between the long and the short axes of the ellipse considered, in order that the machine may work out wider or narrower oval-shaped plate glasses, as explained hereinbefore.

The chamfering of an oval-shaped plate glass by means of the present machine is diagrammatically illustrated in Figs. 5 and 6 wherein $a$ indicates the glass plate and $c$ the circular grinding wheel adapted to chamfer the edge of said glass plate by wearing it off by friction in a well-known manner. Said grinding wheel contacts the edge of the plate at a point $b$, through which all the points of said edge pass in succession. In order that the chamfer cut by the grinding wheel shall have a constant width and slope at all its points, it is necessary that at the point of contact $b$, the tangent $f$ to the grinding wheel shall always be substantially at right angles to the tangent $g$ to the glass plate, the slope of this latter tangent varying according to the particular point of the periphery which is in contact with the grinding wheel at the time considered. In order to keep the tangent $f$ at right angles to tangent $g$, the grinding wheel $c$ is enabled to oscillate about the point of contact $b$, by being mounted for instance on one arm $h$ of a bell-crank lever adapted to pivot about a vertical axis passing through point $b$ and having its other arm $i$ connected by a link $j$ with the pin $k$ of a crank-plate $l$ driven in any suitable manner. The amplitude of oscillation to be given to the grinding wheel $c$ depends on the more or less elongated form of the ellipse $a$, and consequently must be adjustable; this is obtained by moving the pin $k$ in the slot provided in plate $l$ so as to vary the crank-radius.

Figure 12:
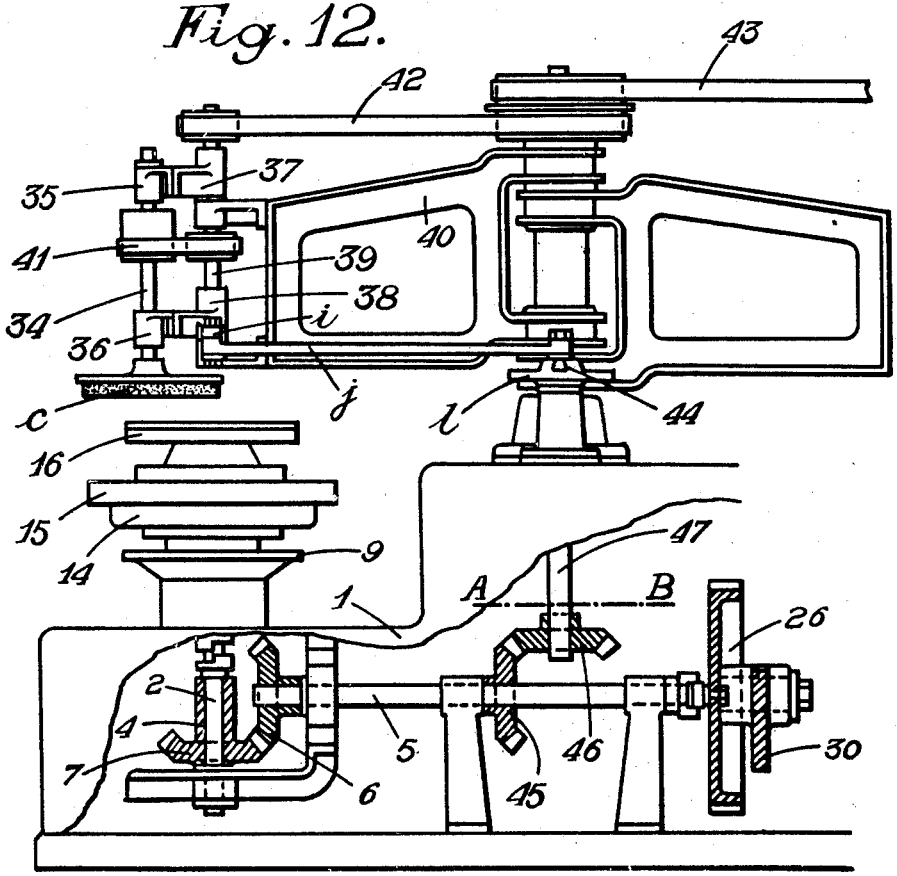
Fig. 12 is a general view in elevation, partly sectional, of a grinding machine embodying my invention.
Figure 14:
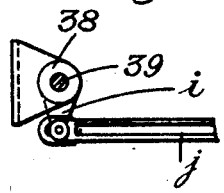
Figs. 14 and 15 are plan views showing details.
Figure 15:
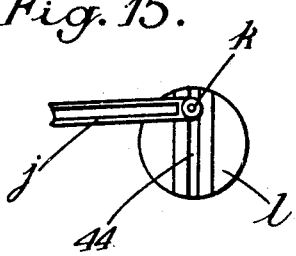

In Fig. 12, which illustrates a complete grinding machine, $c$ is the grinding wheel which is secured on an inclinable shaft 34 mounted in bearing 35, 36 respectively carried by sleeves 37, 38 pivotally mounted on a shaft 39 carried by frame 40. The grinding wheel is adapted to receive two simultaneous motions, one being a rotation on its axis, the other being an oscillatory motion about its point of contact with the article to be ground. To this end shaft 34 can be rotated in its bearings by means of driving belts 41, 42, 43. Said shaft 34 and its bearings 35, 36 can also be oscillated bodily about shaft 39 by means of link $j$ pivoted at one end to the arm $i$ projecting laterally from the sleeve 38 (Figs. 12 and 14). At its other end link $j$ is pivoted on a pin $k$ adjustably secured in a slot 44 (Figs. 12 and 15) in a plate $l$ which is rotated from shaft 5 by means of bevel wheels 45, 46 and vertical shaft 47. It will be understood that shaft 39 is in alignment with point $b$ (Figs. 5 and 6) and that by adjusting the position of pin $k$ in slot 44, the amplitude of the oscillatory movement of shaft 34 and wheel $c$ can be varied at will.

This device, wherein an oscillating grinding wheel is provided, permits of keeping the width and slope of the chamfer substantially uniform over all the periphery of the glass plate, provided that the peripheral speed of the latter be constant, i. e. that all the points of its periphery remain in contact with the grinding wheel during equal intervals of time, otherwise the amount of material ground off would be greater at those points of the edge of the plate that move slower and the chamfer would become uneven. Now, with the double rotation given to the glass plate as above described, if the speed of the driving member, in this case the driving shaft actuating the glass plate, is uniform, the peripheral portions adjacent to the ends of the short axis of the ellipse will move quicker when passing the point of contact of the grinding wheel, than those adjacent to the ends of the long axis of the ellipse. To obtain a good result it therefore is necessary that the speed of shaft 5 shall be varied while the glass plate is being revolved.

Figure 10:
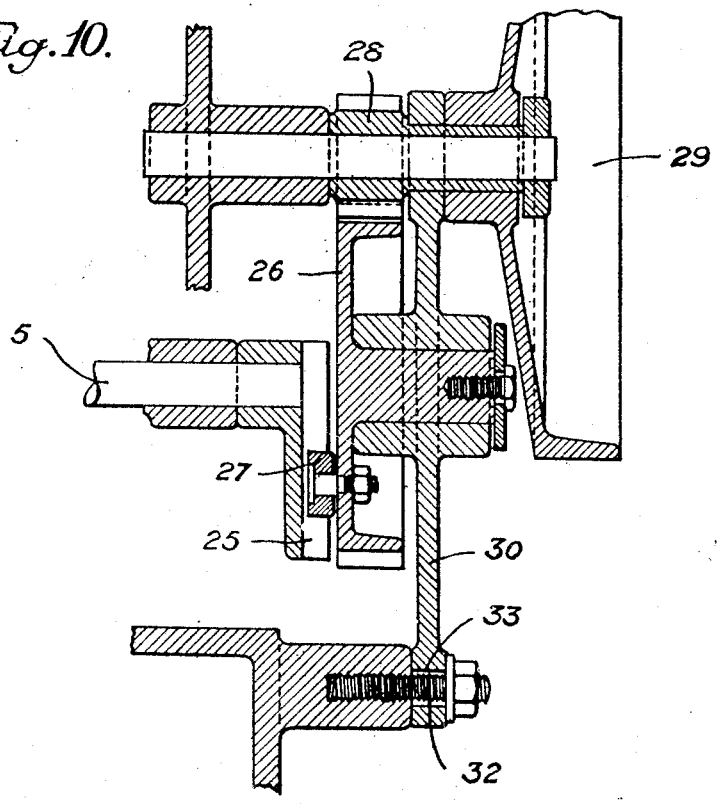
Fig. 10 is a sectional elevation of a variable speed transmitting mechanism as applied to the machine shown in Figs. 7, 8 and 9.
Figure 11:
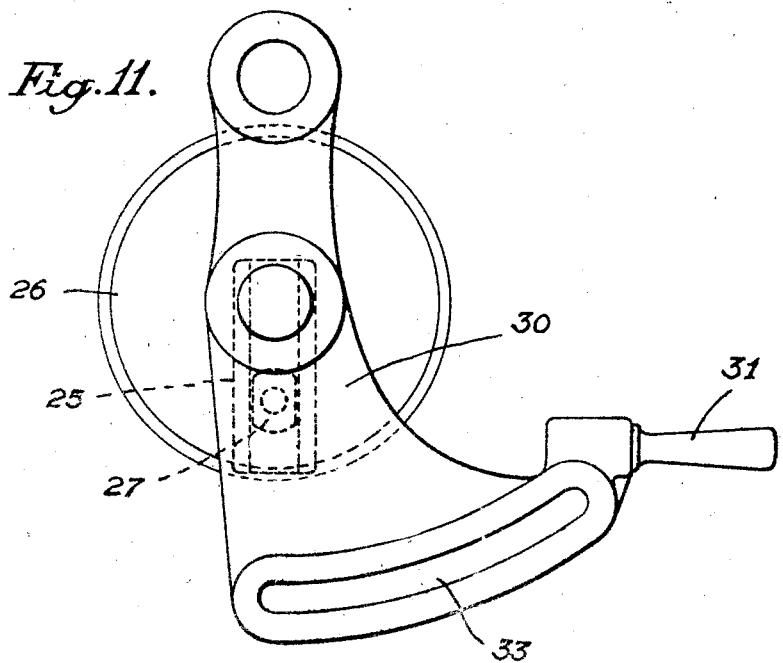
Fig. 11 is a front view of part of said mechanism.
Figure 13:
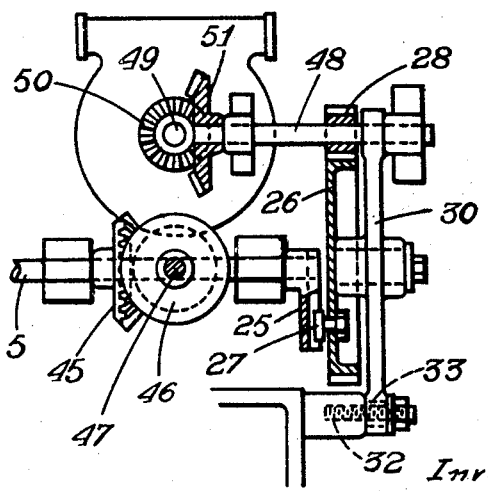
Fig. 13 is a part section on line A—B of Fig. 12.

To this end, shaft 5 is actuated by means of a variable speed transmitting mechanism, illustrated in Figs. 10, 11 and 13. This mechanism comprises a slide-crank 25 keyed on to the end of shaft 5, a spur wheel 26 fitted with a slide-block 27 engaged in the slide of crank 25 and a pinion 28 gearing with spur wheel 26. Pinion 28 is mounted on a spindle 48 which may be driven by a pulley 29 (Fig. 10) or from a shaft 49 by means of bevel wheels 50, 51 as shown in Fig. 13. On spindle 48 is pivotally suspended a bracket 30 in which the spur wheel 26 is journalled. Said bracket is adapted to be swung about spindle 48 by means of a handle 31 and set into the desired position by means of a set screw 32 engaging into a curved slot 33, so as to give the spur wheel 26 a greater or less eccentricity with respect to shaft 5. By properly adjusting this eccentricity shaft 5 may be given a variable rotation, which compensates for the differences tending to arise in the peripheral speed of the elliptical plate so that this latter speed is rendered practically uniform.

This variable speed mechanism may be used to drive several chamfering machines arranged one behind the other. In the arrangement illustrated in Fig. 7, this result may be obtained by using a bevel pinion 6 to actuate, by means of another pinion symmetrically arranged with respect to pinion 7, the driving shaft of a second machine, the latter driving shaft being in line with shaft 5 and supported by a bearing 34 provided to this end in the frame 1.

Obviously, the machine hereinbefore described may also be used for cutting, moulding or plastering oval-shaped frames or for similar purposes, the grinding wheel being in this case replaced by other suitable tools. However, the invention is not limited to the constructional details herein described and illustrated by way of example, and these may be modified according to requirements, without departing from its scope as defined by the appended claims.

We claim:

1. In a machine for forming ovals, the combination of a spindle, a workpiece-carrier eccentric to said spindle, means for rotating said carrier about the axis of said spindle at a given speed, and means for simultaneously rotating said carrier about its own centre at half said speed and in opposite direction.

2. In a machine for forming ovals, the combination of a spindle, a workpiece-carrier eccentric to said spindle, a driving shaft, means operated from said shaft for rotating said carrier about the axis of said spindle at a given speed, means operated from said shaft for simultaneously rotating said carrier about its own centre in the opposite direction and at half said speed, and means for varying the eccentricity of said carrier with respect to said spindle.

3. In a machine for forming ovals, the combination of a stationary spur wheel, an internally toothed ring surrounding said spur wheel, said ring being eccentric to and having a diameter double that of said spur wheel, a pair of pinions interposed between said spur wheel and said ring, a workpiece-carrier on said ring, and means for rotating said ring about the centre of said spur wheel.

4. In a machine for forming ovals, the combination of a stationary spur wheel, a rotatable sleeve concentric thereto, an eccentric plate carried by said sleeve, an internally toothed ring concentric to said plate and rotatable thereon, said ring having a diameter double that of said spur wheel, a pair of co-operating pinions, one of said pinions being mounted on said sleeve and meshing with said spur wheel, the other pinion being mounted on said plate and meshing with said ring, a workpiece-carrier secured to said ring, and means for rotating said sleeve.

5. In a machine for forming ovals, the combination of a stationary spur wheel, a rotatable sleeve concentric thereto, said sleeve having a flange, an eccentric plate carried by said flange, a pin providing a pivotal connection between said plate and flange, means for adjusting the relative angular position of said plate and flange about said pin, a pinion on said pin meshing with said spur wheel, an internally toothed ring concentric to said plate and rotatable thereon, a reversing pinion mounted on said plate, said reversing pinion meshing both with said first mentioned pinion and with said ring, a workpiece-carrier secured to said ring, and means for rotating said sleeve.

6. In a machine for forming ovals, the combination of a hollow spindle, a workpiece-carrier eccentric to said spindle, a suction cup in said carrier, a flexible pipe connecting said cup with said hollow spindle, means for rotating said carrier about said spindle, and means for simultaneously rotating said carrier about its own centre at half the speed of and in a direction opposite to the first rotation.

7. In a machine for forming ovals, the combination of a spindle, a stationary spur wheel on said spindle, a workpiece-carrier eccentric to said spindle, means for rotating said carrier about said spindle, and means comprising an internally toothed ring rotated by said first-mentioned means and pinions cooperating both with said spur wheel and with said ring for simultaneously imparting to said carrier a reverse rotation about its own centre.

8. In a machine for forming ovals, the combination of a stationary spindle, a stationary spur wheel on said spindle, a sleeve rotatable on said spindle, a workpiece-carrier eccentric to said spindle, a connection between said sleeve and said carrier for rotating said carrier about the centre of said spindle, and means interposed between said spur wheel and said carrier for simultaneously imparting to said carrier a reverse rotation at half speed about its own centre.

9. In a machine for forming ovals, the combination of a spindle, a stationary spur wheel on said spindle, a sleeve rotatable on said spindle, means for rotating said sleeve at a varying rate of speed, a workpiece-carrier eccentric to said spindle, means for varying the eccentricity of said carrier, means operated by said sleeve for rotating said carrier about the centre of said spindle, and means interposed between said spur wheel and said carrier for simultaneously imparting to said carrier a reverse rotation at half speed about its own centre.

10. In a machine for forming ovals, the combination with a shaping tool and means for varying the inclination of said tool, of a spindle, a stationary spur wheel on said spindle, a carrier for the workpiece to be shaped by said tool, said carrier being eccentric to said spindle, means for rotating said carrier about the centre of said spindle, and means interposed between said spur wheel and said carrier for simultaneously imparting to said carrier a reverse rotation at half speed about its own centre.

11. In a machine for forming ovals, the combination with a shaping tool and means for operating said tool, of a spindle, a stationary spur wheel on said spindle, a holder for a workpiece adapted to be shaped by said tool, said holder being eccentric to said spindle, means for rotating said holder about said spindle, means cooperating both with said spur wheel and with said first mentioned means for simultaneously imparting to said holder a reverse rotation about its own centre, and means for varying the speed of the combined rotation of said holder in the course of each revolution.

12. In an oval grinding machine, the combination with a grinding tool, means for rotating said tool, and means for oscillating said tool about an axis adjacent its axis of rotation, of a spindle, a holder for a workpiece adapted to be ground by said tool, said holder being eccentric to said spindle, means for rotating said holder about the axis of said spindle at a given speed, and means for simultaneously rotating said carrier about its own centre at half said speed.

EMILE LAFFINEUR.
LOUIS COLLIN.